US012757960B2

United States Patent

(12) United States Patent
Torbati et al.
(10) Patent No.: US 12,757,960 B2
(45) Date of Patent: Oct. 13, 2026

(54) USE OF LIQUID CRYSTAL ELASTOMERS FOR IMPACT PROTECTION

(71) Applicant: Impressio Inc., Denver, CO (US)

(72) Inventors: Amir H. Torbati, Westminster, CO (US); Lyssa A. Bell, Littleton, CO (US); Lillian S. Chatham, Lakewood, CO (US); Richard M. Wojcik, Denver, CO (US); Christopher M. Yakacki, Denver, CO (US); Risheng Zhou, Denver, CO (US)

(73) Assignee: Impressio, Inc., Denver, CO (US)

( * ) Notice: Subject to any disclaimer, the term of this patent is extended or adjusted under 35 U.S.C. 154(b) by 5 days.

(21) Appl. No.: 18/229,090

(22) Filed: Aug. 1, 2023

(65) Prior Publication Data

US 2024/0041150 A1 Feb. 8, 2024

Related U.S. Application Data

(60) Provisional application No. 63/394,451, filed on Aug. 2, 2022.

(51) Int. Cl.
*A42B 3/12* (2006.01)

(52) U.S. Cl.
CPC .............. *A42B 3/125* (2013.01); *A42B 3/124* (2013.01); *B32B 2305/55* (2013.01)

(58) Field of Classification Search
CPC ... A42B 3/125; A42B 3/124; B32B 17/10504; B32B 2305/55
See application file for complete search history.

(56) References Cited

U.S. PATENT DOCUMENTS

| | | | | |
|---|---|---|---|---|
| 9,907,343 | B2 * | 3/2018 | Lacey | A41D 13/015 |
| 2012/0297526 | A1 * | 11/2012 | Leon | A63B 71/10 2/413 |
| 2019/0111658 | A1 * | 4/2019 | Gupta | B29C 70/688 |
| 2020/0113267 | A1 * | 4/2020 | Light | B33Y 40/20 |
| 2020/0115483 | A1 * | 4/2020 | Godman | C08F 2/48 |
| 2021/0323263 | A1 * | 10/2021 | Cagle | B32B 15/14 |
| 2022/0079280 | A1 * | 3/2022 | Laperriere | B22F 10/10 |
| 2024/0000182 | A1 * | 1/2024 | Weber | A42B 3/06 |

FOREIGN PATENT DOCUMENTS

| | | | | |
|---|---|---|---|---|
| WO | WO-2020102335 | A1 * | 5/2020 | A42B 3/064 |
| WO | WO-2022125311 | A2 * | 6/2022 | A42B 3/06 |

OTHER PUBLICATIONS

Barnes, Morgan et al., "Understanding the effect of liquid crystal content on the phase behavior and mechanical properties of liquid crystal elastomers" from Soft Matter, Jul. 21, 2022, Royal Society of Chemistry, vol. 18, No. 27, pp. 5074-5081 (Year: 2022).*

* cited by examiner

*Primary Examiner* — Brian Handville
(74) *Attorney, Agent, or Firm* — Jackson Walker LLP

(57) ABSTRACT

A helmet for improved impact protection includes a shell and a first pad disposed within the shell. The first pad includes a first lattice structure with at least one LCE pillar. In some aspects, the helmet includes a plurality of pads. Each pad may include multiple regions. Each region of a pad may be comprised of different lattice structures, some of which contain LCE pillars and some of which do not.

12 Claims, 8 Drawing Sheets

USE OF LIQUID CRYSTAL ELASTOMERS FOR IMPACT PROTECTION

CROSS-REFERENCE TO RELATED APPLICATIONS

This patent application claims priority from, and incorporates by reference the entire disclosure of, U.S. Provisional Patent Application No. 63/394,451 filed on Aug. 2, 2022.

STATEMENT REGARDING FEDERALLY SPONSORED RESEARCH

This invention was made with government support under contract W911QY21C0038 and W911QY23C0064 awarded by the Department of Defense. The government has certain rights in the invention.

TECHNICAL FIELD

The present disclosure relates generally to liquid crystal elastomers (LCE) and, more particularly, but not by way of limitation, to the use of LCE for impact protection.

BACKGROUND

This section provides background information to facilitate a better understanding of the various aspects of the disclosure. It should be understood that the statements in this section of this document are to be read in this light and not as admissions of prior art.

Head trauma can occur when the head experiences an impact. Helmets are often worn to reduce the effects of impacts to the head, hopefully preventing trauma. From 2000 to 2018, the Department of Defense reported that 380,000 military personnel had suffered a traumatic brain injury (TBI). The most common form of TBI is a concussion, which accounts for approximately 75% of TBI cases. Concussions are of crucial concern to the military. There is a critical need for new materials and designs for helmet liners that can reduce injury and aid in survival and evasion. In addition to improved blunt trauma performance, new technology should balance many factors, such as improved comfort/fit and accommodate integrated systems to improve soldier performance.

Depending on the application, helmets come in many shapes and sizes and can have soft, flexible exteriors or hard, shell-like exteriors. In either case, the helmet is meant to absorb and/or deflect energy from an impact to reduce the likelihood of head trauma. Despite the widespread use of helmets, head traumas are still quite common due to the severity of impacts experienced. Prior helmet designs relied on foams, rubbers, air bladders, and the like to lessen the effects of impacts. While these prior helmet designs have been effective in reducing head trauma resulting from some impacts, a solution that is even more capable of reducing head trauma is needed.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

Relying on materials science research, additive manufacturing, and computer-driven design, the designs discussed herein improve head safety by combining ultra-dissipative liquid crystalline elastomers (LCEs) and lattice designs to 3D-print helmet liners to reduce the risk of concussions. This technology addresses safety requirements such as the need for novel polymeric materials and 3D-printed lattices for improved energy absorption; better thermal and moisture management; liners with multi-impact capability; and increased comfort. The designs discussed are relevant for all types of helmet users, including military, athletics, construction applications and the like.

In some aspects, a helmet includes a shell and a first pad disposed within the shell, the first pad comprising a first lattice structure with at least one LCE pillar.

In some aspects, the helmet can include a second pad having a second lattice structure.

In some aspects, the second lattice structure of the second pad can include at least one LCE pillar.

In some aspects, the first pad comprises a first region and a second region. The first region includes the first lattice structure with the at least one LCE pillar and the second region includes a second lattice structure that is different than the first lattice structure.

In some aspects, the helmet includes a plurality of pads disposed within the shell and spaced apart from one another and from the first pad.

In some aspects, the helmet includes seven pads.

In some aspects, the first lattice comprises a plurality of buckling columns.

In some aspects, the first lattice structure includes a plurality of struts, each strut of the plurality of struts connected between a buckling column of the plurality of buckling columns or an adjacent strut of the plurality of struts.

In some aspects, the at least one LCE pillar is disposed within a column of the first lattice structure.

In some aspects, the first lattice structure is a structured Voronoi lattice.

In some aspects, the LCE pillar is comprised of monodomain LCE.

In some aspects, the LCE pillar is oriented in the direction of impacts.

In some aspects, a pad for a helmet includes a first lattice structure with a buckling column, a plurality of struts, and an LCE column. The pad incudes an LCE pillar disposed within the LCE column.

In some aspects, the pad comprises a first region and a second region, the first region comprising the first lattice structure and the second region comprising a second lattice structure.

In some aspects, the second lattice structure comprises a different lattice pattern from the first lattice structure.

In some aspects, the first region is a layer that extends completely over the second region.

In some aspects, the first region extends only partially over the second region.

In some aspects, the diameter of the buckling column is greater than the diameter of the LCE column.

In some aspects, the diameter of the buckling column is smaller than the diameter of the LCE column.

In some aspects, the first lattice structure is a structured Voronoi lattice.

In some aspects, wherein the LCE pillar is comprised of monodomain LCE.

In some aspects, the LCE pillar is oriented in the direction of impacts.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

Figure 1A:
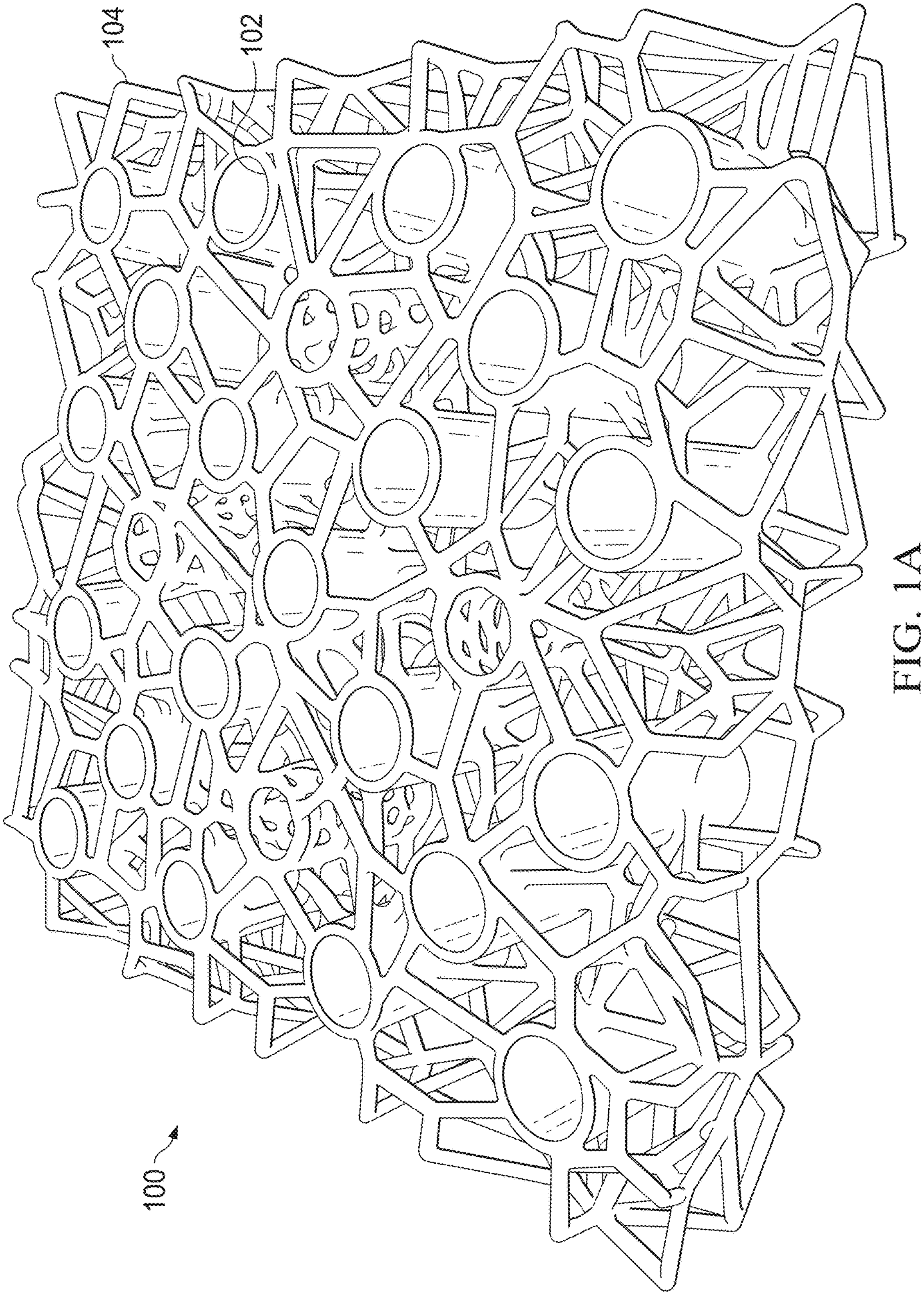
FIGS. 1A and 1B illustrate lattice structures without LCE pillars and with LCE pillars, respectively.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described. Reference will now be made to more specific embodiments of the present disclosure and data that provides support for such embodiments. However, it should be noted that the disclosure below is for illustrative purposes only and is not intended to limit the scope of the claimed subject matter in any way.

A wide variety of helmet designs have been used to protect the wearer's head, with each design intending to absorb and/or deflect energy from impacts. A common feature of a helmet is some kind of padding that lines an interior portion of the helmet. The padding acts to limit the amount of force that is imparted to the wearer's head. Various padding types have been used, including foams, rubbers, air bladders, and the like. While these padding options have been effective in reducing head trauma resulting from some impacts, their effectiveness is compromised when higher energy impacts are encountered. To improve the effectiveness of the helmet at preventing head trauma, new padding has been developed that incorporates LCE pillars into a lattice structure. The inclusion of the LCE pillars into the lattice structure has been proven to greatly reduce the peak acceleration imparted to the wearer's head. LCE material has the ability to dissipate large amounts of energy, and its mechanical properties are tunable by changing the crosslinking density, polymer chain alignment, and mesogen orientation of the material. LCEs are unique in their ability to dissipate energy over a large frequency range, rather than the limited dissipation observed in most elastomers (i.e., silicones and hydrogels). LCEs have vastly superior energy dissipation properties relative to traditional elastomers such as silicone or hydrogels. Main-chain LCEs are defined by synthesizing liquid-crystal mesogens directly into the polymer backbone; mesogen reorientation under mechanical stress provides a temperature and frequency insensitive mechanism for dissipating energy that is more robust than typical viscoelasticity. Adding LCEs to lattices improves protection of the head under blunt impact conditions due to their highly rate-dependent, energy-absorbing material properties. LCEs are a unique class of polymer that provides mechanical anisotropy and behave like biological tissues. Overall, this approach combines novel materials and additive manufacturing to rapidly develop and deploy multi-functional helmet liners. Without using novel materials and advanced manufacturing techniques, improvements to helmet safety will remain incremental. The designs discussed herein combine energy dissipating materials and advanced manufacturing (3D printing) to optimize the helmet's performance for both linear and rotational accelerations. 3D printing techniques, such as multi-jet fusion, stereolithography, digital light processing fused filament fabrication, and laser sintering may be used to print the lattice, with thermoplastic polyurethane (TPU) being an exemplary material with which to construct the lattice. The high compressibility of LCEs maximizes displacement and extends the time of impact to lower linear accelerations. Conversely, using anisotropic LCE materials and lattice designs can decouple the shear and compression properties of the liner accelerations, enabling greater control to tailor impact mechanics and to decrease linear and rotational accelerations.

3D-printed lattices embedded with LCE material provide the following benefits relative to traditional helmet padding or 3D-printed lattices.

Survivability: The columnar lattice structures buckle upon impact, allowing far superior energy dissipation for specified impact energy. Performance is further enhanced beyond any potential competitor by strategically adding LCEs to discrete spatial locations, allowing for rate-dependent energy absorption over a wide range of impact velocities.

Comfort and thermal Management: The columnar lattice structures naturally allow for better heat dissipation and moisture management (i.e., sweat) by using breathable lattice structures. Customizable 3D-printed lattice structures enable soldier-specific fit and for integrating systems inside helmets. Comfort is often the number-one factor for a user choosing to wear a helmet, while heat stroke is one of the most preventable injuries while wearing a helmet. Customizable 3D-printed lattice structures allow for a user-specific fit. Lattices naturally allow for better airflow and heat dissipation by using breathable lattice structures.

Rapid production and deployment: The liners that are comprised of the columnar lattice and LCE columns are fabricated to be interchangeable and modular, allowing for upgradable design capability to be used in existing and future helmet designs. The lattices can be easily washed and reinserted. Lattices can also be reprinted on-site if a replacement is needed.

User-Specific optimization: By utilizing 3D-printing and digital design, helmets can be optimized to a user's head size.

On-demand production: Liners are fabricated to be interchangeable and modular, allowing for upgrade design capability to be used in existing and future helmet designs. Lattices can be easily washed and reinserted, and can be reprinted on-site if a replacement is needed.

Broad Adoption: The designs and methods discussed herein are widely applicable to any helmet application.

FIG. 1A illustrates a lattice structure 100 without LCE pillars according to aspects of the disclosure. Lattice structure 100 comprises a plurality of buckling columns 102 that are interconnected to one another by a plurality of struts 104. Lattice structures 100, 110 of FIGS. 1A and 1B, respectively, are made of a thermoplastic elastomer. In other aspects, lattice structures 100, 110 may be made of any stiff elastomeric material (e.g., having a Shore A hardness value greater than 60). In various aspects, the orientation of each strut 104 is randomized, forming a structured Voronoi lattice having structures (e.g., buckling columns 102) embedded within a random lattice. In various aspects, buckling columns 102 may comprise other cross-sectional shapes (e.g., triangular, square, polygonal cross-sections and the like).

Figure 1B:
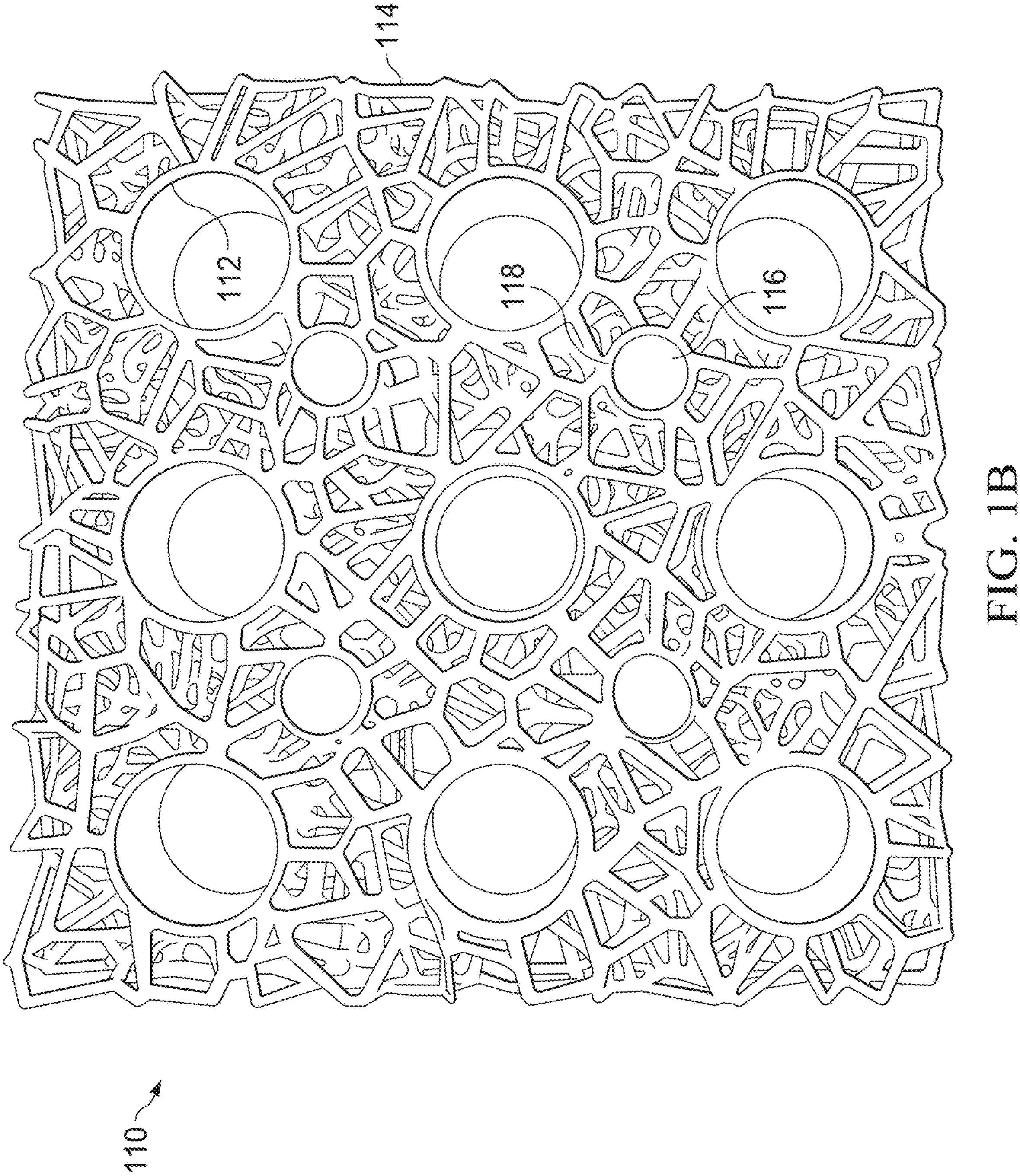

FIG. 1B illustrates a lattice structure 110 that includes a plurality of buckling columns 112, a plurality of struts 114, and a plurality of LCE pillars 116. Similar to lattice structure 100, the plurality of struts 114 of lattice structure 110 are also randomized to form a structured Voronoi lattice and buckling columns 112 may comprise other shapes. Each LCE pillar 116 is press fit into an LCE column 118. In some aspects, LCE pillars 116 are aligned in the direction of impact with the polymer chains and liquid crystal mesogens aligned vertically along the pillar (i.e., monodomain LCE). Orienting the polymer chains and liquid crystal mesogens increases impact absorption performance. In other aspects, the LCE pillars 116 are not aligned in the direction of impact. In other aspects, the LCE pillars 116 comprise polydomain LCE. LCE Pillars 116 and LCE columns 118 may comprise other cross-sectional shapes (e.g., triangular, square, polygonal cross-sections and the like).

In the design of FIG. 1B, buckling columns 112 are shown with a diameter that is greater than a diameter of LCE columns 118. In other aspects, the diameter of buckling columns 112 could be equal to or less than LCE columns 118 and depends upon the particular application for lattice structure 110.

Figure 2:
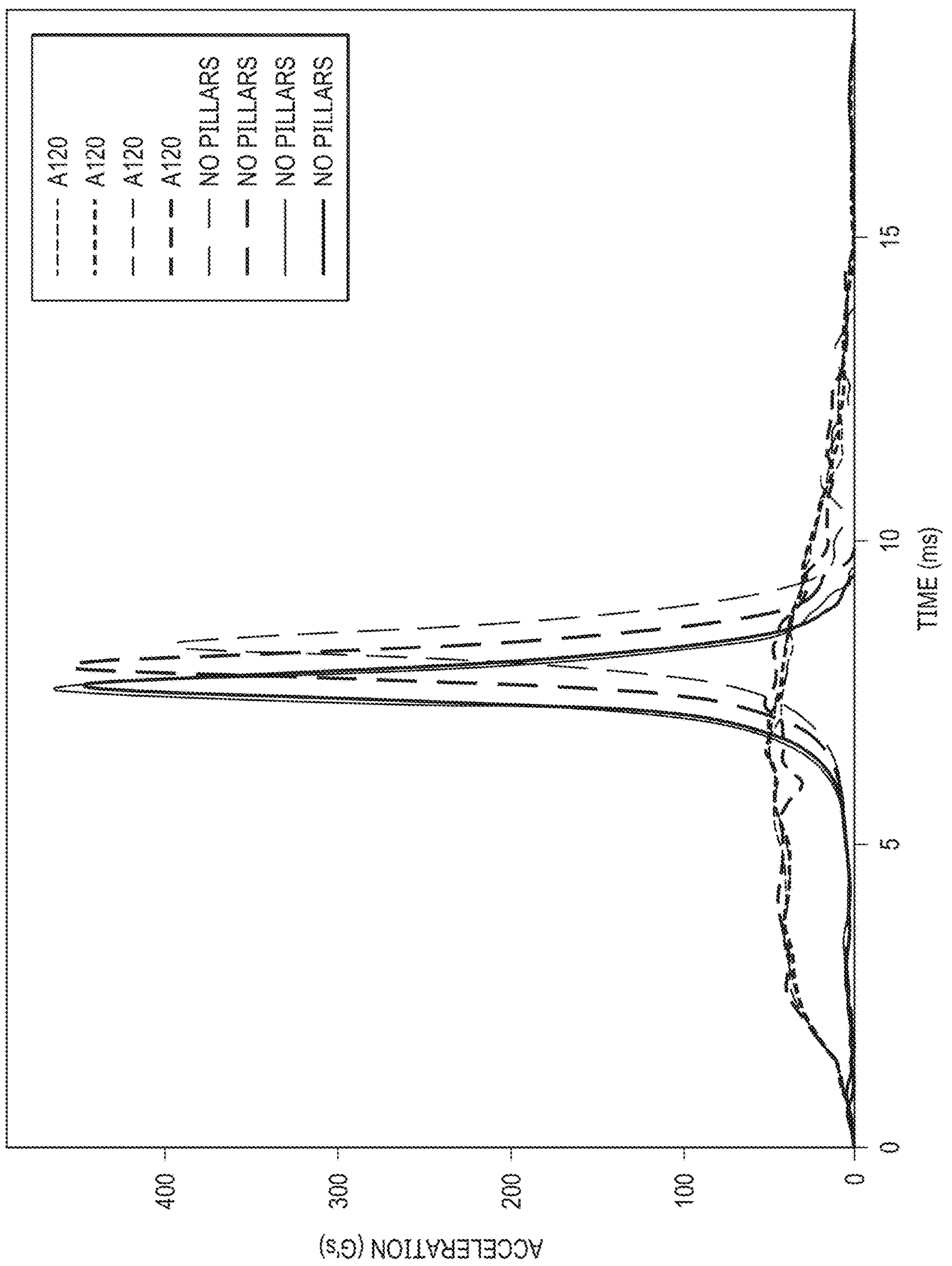
FIG. 2 is a graph of acceleration vs. time for impacts tests of lattice structures without LCE pillars and with LCE pillars.

FIG. 2 is a graph of acceleration vs. time for impact tests of lattice structures without LCE pillars (e.g., similar to FIG. 1A) and with LCE pillars (e.g., similar to FIG. 1B). Incorporation of the LCE pillars into the lattice structure resulted in a dramatic decrease in the acceleration experienced. The lattices with LCE pillars resulted in acceleration around 50-60 g's vs. the lattices without LCE pillars that resulted in acceleration around 400 g's.

Figure 3A:
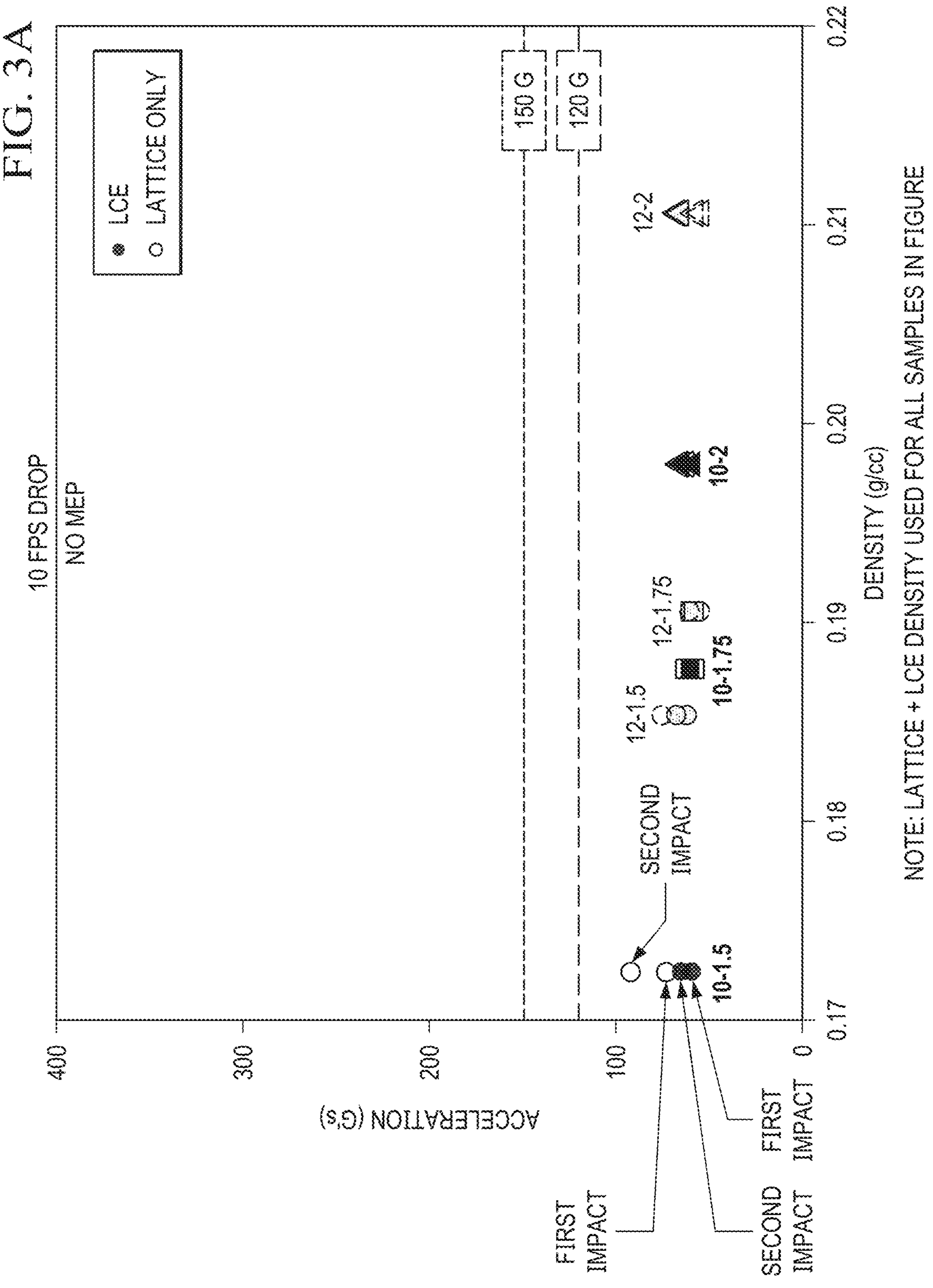
FIGS. 3A-3C are graphs of acceleration vs. density for lattice structures without LCE pillars and with LCE pillars at three different drop speeds.
Figure 3B:
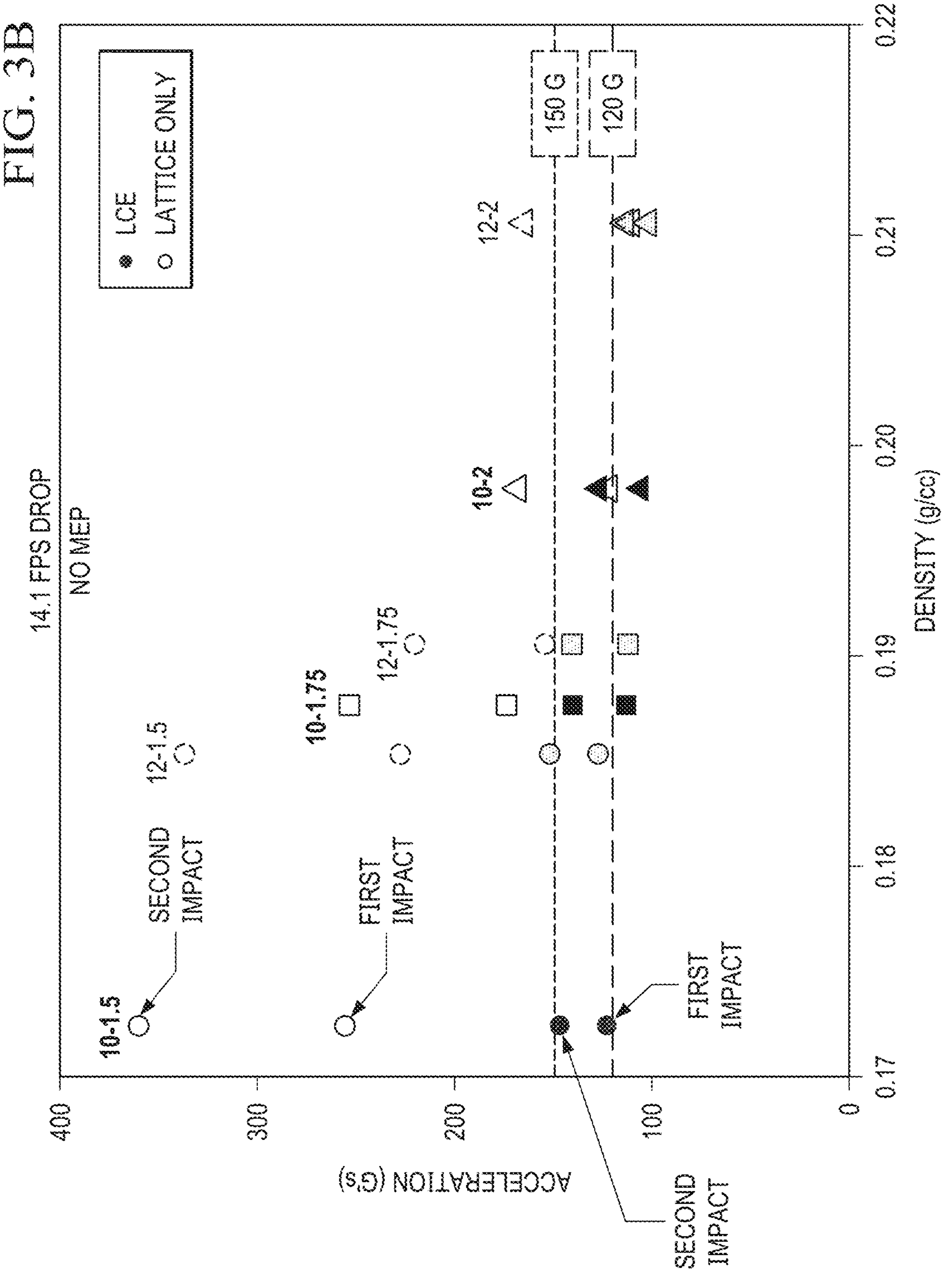
Figure 3C:
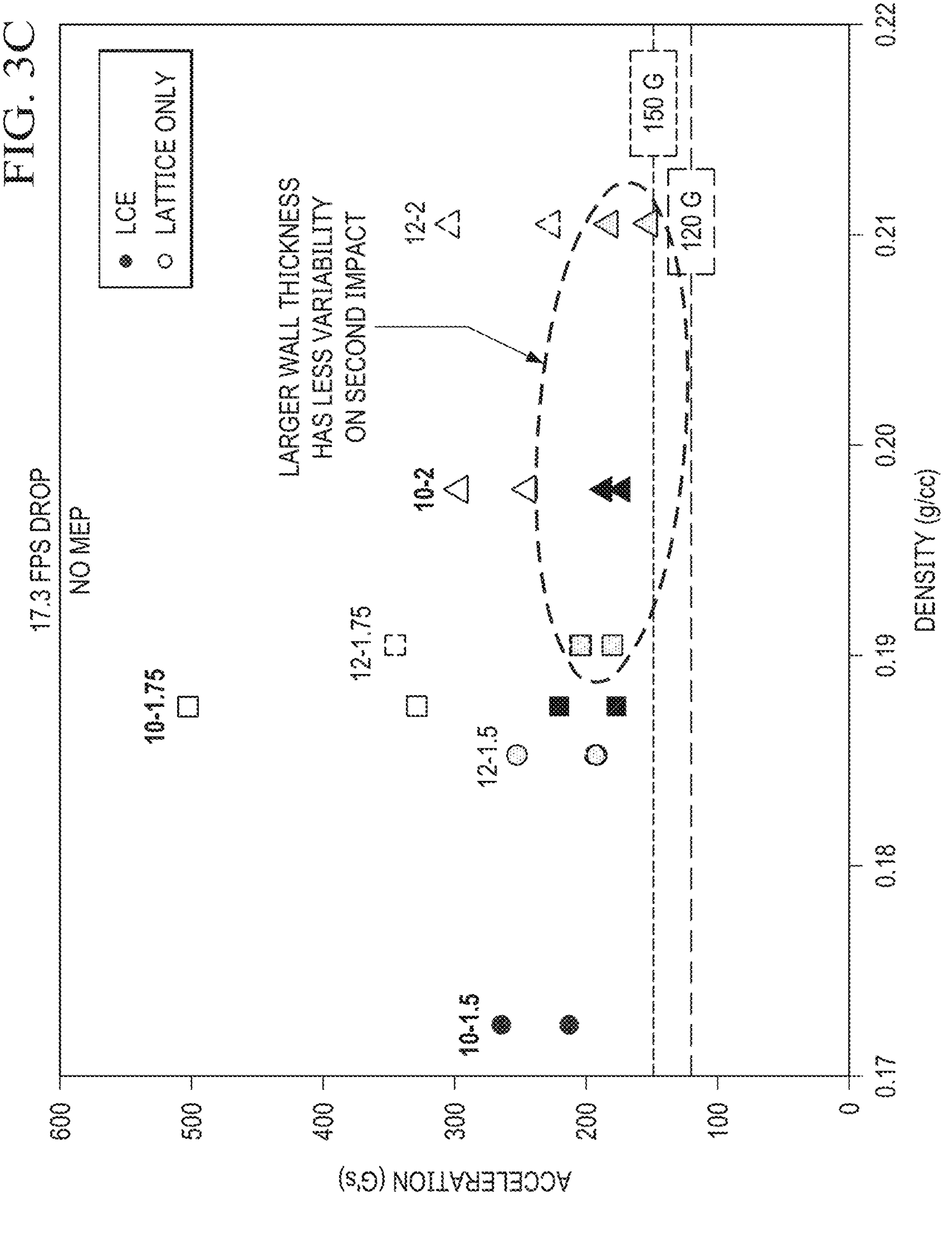

FIGS. 3A-3C are graphs of acceleration vs. density for lattice structures without LCE pillars and with LCE pillars at drop speeds of 10 feet per second, 14.1 feet per second, and 17.3 feet per second, respectively. For each drop speed, lattices having different densities were tested. For each test, first and second impacts were tested. For drop testing, a 5 kg steel impact head with a 73 mm radius was dropped from varying heights to achieve the desired impact speeds. A monorail guided the impact head, and an accelerometer was attached to the top of the impact head to record acceleration values throughout the impact. Repeat testing was done where the second impact occurred approximately 60 seconds after the first. Samples were placed on a steel surface without the use of an elastomeric pad (i.e., MEP pad).

At a drop speed of 10 feet per second (FIG. 3A), lattices with and without LCE pillars perform similarly. At this lower impact speed, the lattice structure itself—without the help of the LCE pillars—is able to absorb the impact and limit the experienced acceleration below 100 g's. The lattices performed similarly across all densities tested. At a drop speed of 14.1 feet per second (FIG. 3B), the lattices without LCE pillars performed significantly worse than lattices with LCE pillars. Increasing the lattice density improved the performance of both the lattice without the LCE pillars and the lattice with the LCE pillars, but the lattices with the LCE pillars outperformed the lattices without the LCE pillars. FIG. 3B also demonstrates the need for rate-dependent materials at higher impact energies to prevent bottoming out (lattice collapsing entirely). At a drop speed of 17.3 feet per second (FIG. 3C), lattices with LCE pillars again outperformed lattices without LCE pillars.

Figure 4:
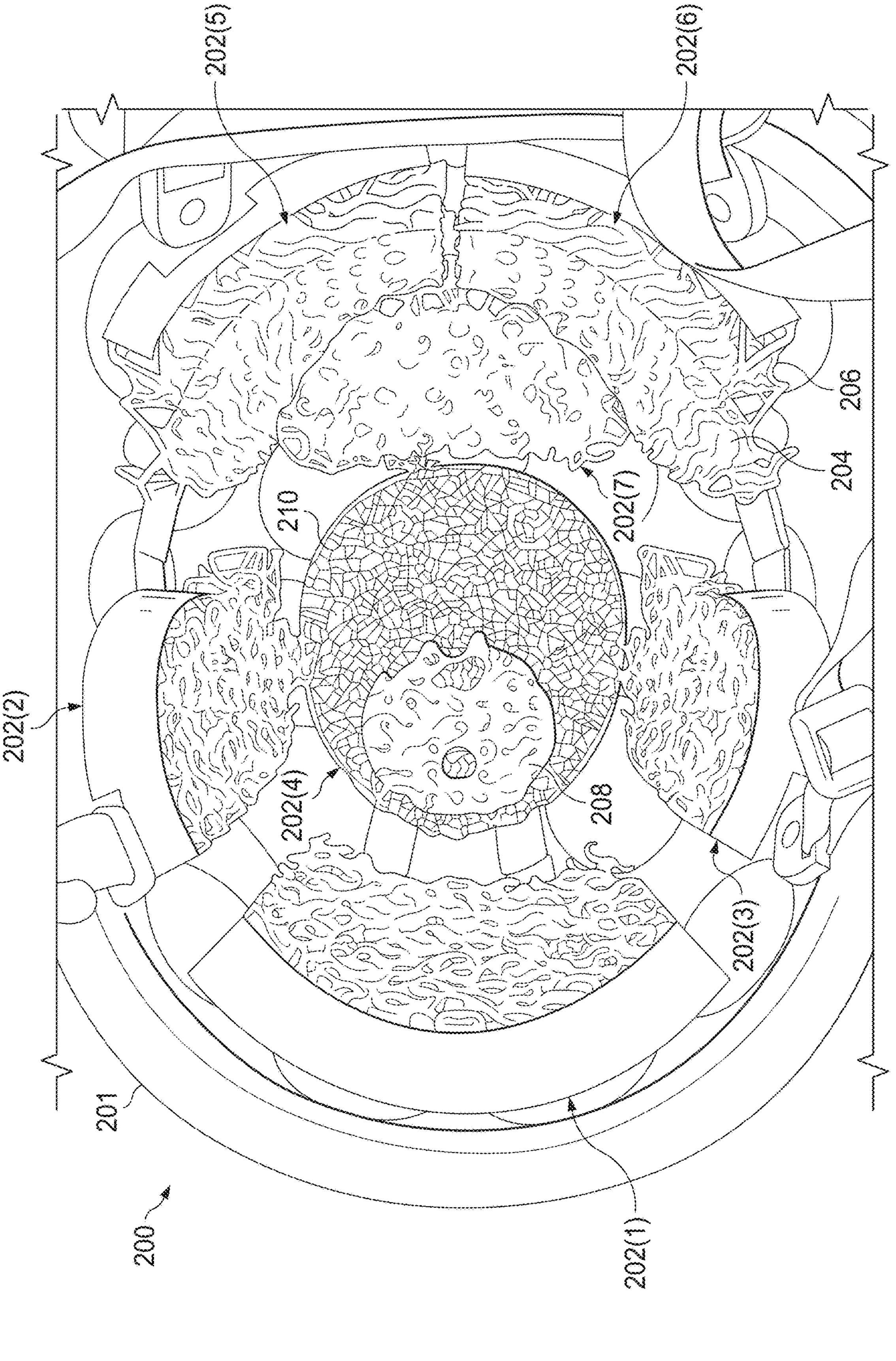
FIG. 4 is an interior view of a helmet incorporating a plurality of lattice-LCE pads.

FIG. 4 is an interior view of a helmet 200 that includes a shell 201 and a plurality of lattice pads 202(1)-(7) set into an interior thereof. One or more of lattice pads 202(1)-(7) may include LCE pillars. Those skilled in the art will appreciate that the number, shape, and size of pads 202 may vary. For example, a single unitary pad 202 may be used to line an inside of helmet 200. In another aspects, the plurality of lattice pads 202(1)-(7) may be connected together (e.g., with straps or the like) to form a single structure that may be inserted or removed from helmet 200. As illustrated in FIG. 4, pads 202 are arranged as seven "islands" that are spaced apart from one another and positioned to surround a user's head to protect the user from impacts. Those skilled in the art will appreciate that the number of islands can vary. Utilizing an island design can help reduce the overall weight of helmet 200 compared to a design that lines the entirety of helmet 200. Reducing weight can be desirable for both comfort and to reduce injuries. Helmet 200 is illustrated as a military-style helmet, but it will be appreciated that helmet 200 may be other types of helmets, including athletic (football, baseball, hockey, lacrosse, etc.), construction hardhat, and various other types of helmets worn to protect the user from impacts.

Pad 202(1) is positioned in the front of helmet 200, pads 202(2)-(3) are positioned on opposite sides of helmet 200, pad 202(4) is positioned on the top/crown of helmet 200, pads 202(5)-(6) are positioned in the back/nape of helmet 200, and pad 202(7) is positioned posterior of pad 202(4). One or more of pads 202(1)-(7) may include a lattice structure that incorporates one or more LCE pillars. In some aspects, fewer than all pads 202 may include lattice structures that incorporate LCE pillars.

In some aspects, one or more of pads 202(1)-(7) may include more than one lattice type. For example, a pad may include two or more regions, with a different lattice type in each region. As shown in FIG. 4, pad 202(6) is shown having two regions, 204 and 206. The two regions may be layers (e.g., an inner layer near a user's head and an outer layer away from the user's head). Region 204 is on the inside of pad 202(6) and contacts a user's head. The lattice of region 204 has a gyroid shape that resembles wavy noodles and does not include an LCE pillar. Region 206 is on the outside of pad 202(6) and includes a lattice that resembles lattice structure 110 of FIG. 1B. Region 206 does include one more LCE pillars. Each of pads 202(1)-(7) may have a similar structure comprised of multiple regions.

Pad 202(4) illustrates a further example of a pad, and includes two regions, 208 and 210. Region 208 comprises only a small portion of the inside of pad 202(4) and includes the wavy noodle lattice design. Region 210 comprises the remainder of pad 202(4) and includes a lattice that is similar to lattice structure 110. In some aspects, pad 202(4) includes a third region that is a layer away from the user's head. This third region includes a lattice structure with one or more LCE pillars.

Working Examples

Testing of LCE Pillars

LCE pillars were tested at extremely slow and fast strain rates (i.e., $10^{-4}$ and $3000^{-1}$ s). The rates represent placing a helmet on a head and letting it relax, to extremely fast blunt impacts. The results demonstrated that the material is soft and compliant at low strain rates—meaning the pillar may conform or relax to the wearer's head. For example, at low true strain rates of $10^0$ to $10^{-4}$ $s^{-1}$, true stress values ranged from 0.1 to under 1.5 MPa. As the strain rate increases to impact speeds, the stress response increases over 2 orders of magnitude. For example, at higher true strain rates of 800 to 3000 $s^{-1}$, true stress values ranged from 10 to 30 MPa. Furthermore, the behavior exhibits a stress plateau ideal for energy absorption and mimics compressible foams. This behavior is attributed to the rotation of liquid crystal molecules during compression or impact, resulting in non-linear behavior and superior dissipating energy. Other solid materials, like Sorbothane or silicone, cannot match this behavior and perform poorly when impacted.

Temperature Testing

Evaluation of lattice performance at cold and hot temperatures—Testing of the TPU material and lattices is performed at temperatures ranging from −10.0+/−3° C. to 54.4+/−3° C. to measure the influence of environmental conditions (i.e., temperature) on the performance of the TPU material. It is vital to measure the effect of temperature on the TPU material separate from the LCE, as it provides an independent assessment of how environmental conditions influence both TPU and LCE.

First, a thermal dynamic mechanical analysis is run on the TPU material. Rectangular samples measuring 1×5×30 mm are tested at 0.2% dynamic strain at a frequency of 1 Hz. The material's storage modulus is evaluated as the temperature is ramped from −20 to 60° C. This determines how the material's stiffness changes as a temperature function. For example, this data may reveal the sample is 30% stiffer in cold environments and 20% softer in hot environments. While these numbers are just theoretical examples, the actual data will allow for design decisions to be made by understanding how the material is affected by the environment.

Second, tensile testing is performed at −10, 22, and 54° C. ASTM Type V samples are printed from TPU and tested using a uniaxial test machine. The samples are equilibrated in a thermal chamber equipped to the test machine and pulled to failure at a rate of 0.2 mm/s. This testing will elucidate whether the environment affects the ductility of the samples. Verifying that the cold temperature does not make the TPU material brittle is important.

Third, flat samples are evaluated via drop testing at temperatures of −10.0+/−3° C. to 54.4+/−3° C., respectively. Samples are prepared that measure 4"×4"×¾", and the samples are equilibrated at the temperatures for a minimum of 12 hours. After being removed from the temperature chamber, they are placed on a flat anvil and tested within 30 seconds. Each set of samples is tested at 3 impact speeds, 10, 14.1, and 17.3 fps. The samples are monitored for performance and durability throughout the duration of the testing. The acceleration vs. time profiles of hot and cold testing are compared to the ambient conditions, serving as a baseline.

Evaluation of LCE performance at cold and hot temperatures—First, additional LCE chemistries are formulated for testing and evaluation. One LCE chemistry used had an onset of glass transition between −10 and 0° C. Additional chemistries for the LCE have been made to increase and decrease the glass transition of the LCE material by −5-10° C. This will indicate how changes in the thermomechanical behavior of the material will translate to impact performance under different environmental conditions.

Next, drop testing of LCE pillars is performed. To isolate the influence of the LCE, pillars are installed into Voronoi lattices without buckling columns. It has been shown that Voronoi lattices without buckling columns are highly compliant but work as a suitable carrier for LCE pillars.

Drop testing of the lattice-LCE samples at cold and hot temperatures—For both lattice and lattice-LCE tests, samples are prepared that measure 4"×4"×¾". Tests are performed at 10.0, 14.1, and 17.3 fps with the goal to achieve under 120 g's for the 10 fps impacts and 150 g's for the 14.1 fps impact. A 5 kg impactor is used on a 1" MEP pad with hardness 60+/−2 A; however, testing may also be repeated without an MEP pad. The removal of the MEP pad creates a worst-case scenario that better differentiates the performance of pads.

This stage includes at least 2 rounds of testing. The first round of testing uses the down-selected pads from the previous contract. These lattice-LCE pads are tested at −10.0+/−3° C. and 54.4+/−3° C. and the results will be compared to ambient conditions. The second round of testing analyzes the results and optimizes the performance using two primary parameters. The first parameter is the different LCE chemistries developed. The second parameter is adjusting the buckling columns' wall thickness. Slight changes to the wall thickness of the buckling columns can be used to tailor the response of the TPU lattice and that this parameter plays the most significant role in overall lattice behavior.

Helmet Testing

Using results from the lattice and LCE testing described above, a helmet liner comprising a 7-pad array (e.g., see FIG. 4) is constructed. The helmets are impacted on a hemispherical anvil. Each of the seven impact sites is tested twice, with 60 seconds between impacts.

Evaluate LCE and TPU lattice ECH liner at hot temperature—Per ATC-MMTB-IOP 029, the LCE and TPU lattice helmet system is placed within an environmental chamber set to a temperature of 54.4+/−3° C. for no less than 12 hours. After the required heat soaking time has elapsed, the helmet is placed as quickly as possible onto the helmet testing frame. The helmet position index for the DOT-C head form is verified, and impact testing begins. The helmet is tested in the following order: Crown, Front, Rear, Left Side, Right Side, Left Nape, and Right Nape. Tests are performed at 10.0, 14.1, and 17.3 fps with the goal to achieve under 120 g's for the low-velocity impact and 150 g's for the higher velocity impacts.

Evaluate LCE and TPU lattice ECH liner at a cold temperature—Per ATC-MMTB-IOP 029, the LCE and TPU lattice helmet system is placed within an environmental chamber set to a temperature of −10.0+/−3° C. for no less than 12 hours. After the required cold soaking time has elapsed, the helmet is placed as quickly as possible onto the helmet testing frame. The helmet position index for the DOT-C head form is verified, and impact testing begins.

The helmet is tested in the following order: Crown, Front, Rear, Left Side, Right Side, Left Nape, and Right Nape. Tests are performed at 10.0, 14.1, and 17.3 fps with the goal to achieve under 120 g's for the low-velocity impact and 150 g's for the higher velocity impacts.

Figure 5:
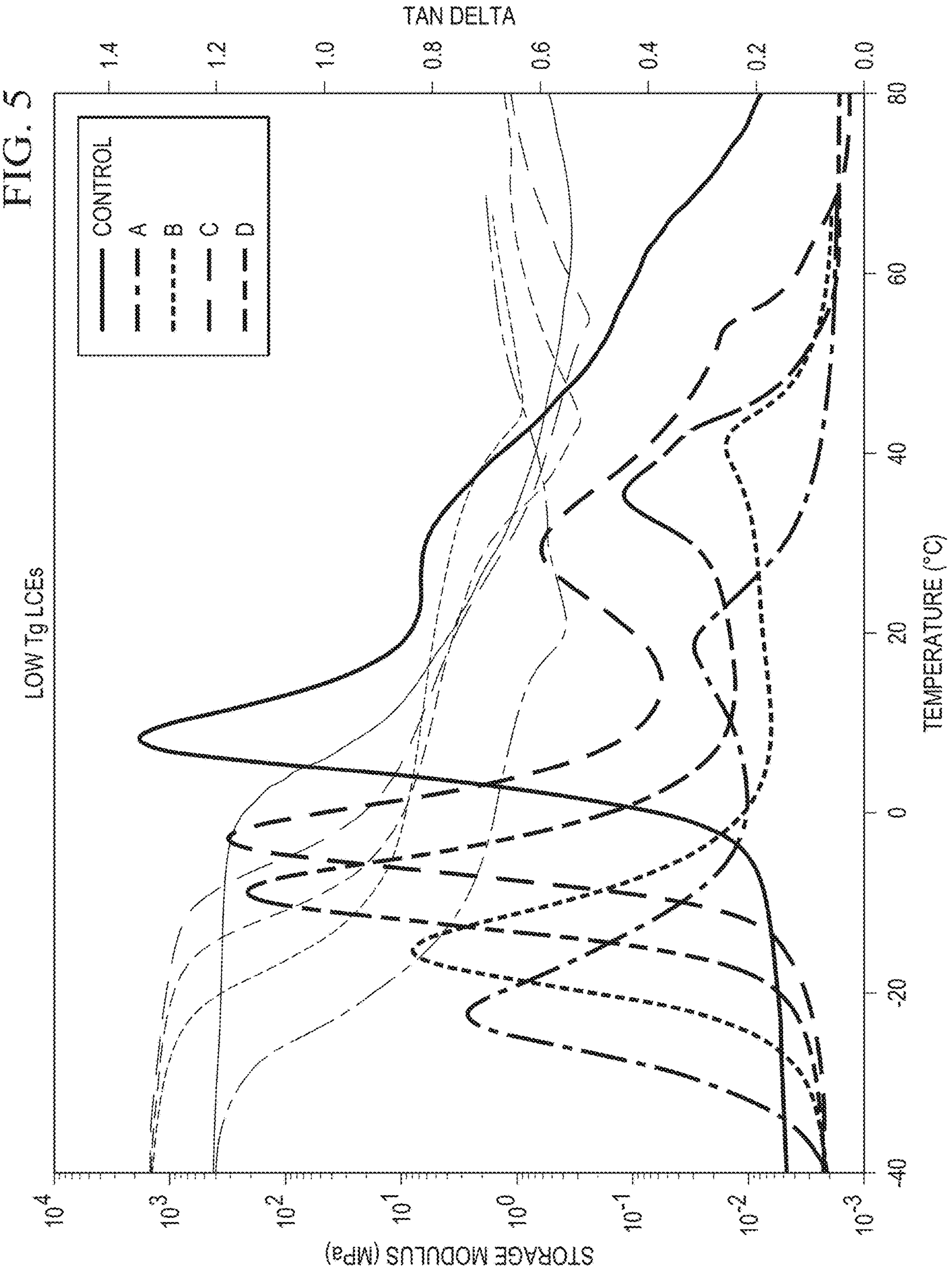
FIG. 5 is graph of storage modulus (MPa) vs Temperature (° C.) for multiple LCE chemistries.

FIG. 5 is graph of storage modulus (MPa) and Tan Delta vs Temperature (° C.) for multiple LCE chemistries. The LCE chemistry was varied by varying the mesogen, spacer, and crosslinking density to achieve a lower glass transition temperature (Tg) and a higher nematic to isotropic temperature (Ti). In LCE chemistry, changing the mesogen helped to change the Tg and shift the spacer helped to shift the (Ti). The LCE Control chemistry used mesogen 1 and spacer 1. The LCE Control had a Tg of about 5° C. and a Ti of about 65° C. The LCE A chemistry used mesogen 2 and spacer 1. The LCE A had a low Tg of about −22° C. and a Ti of about 19° C. The LCE B chemistry used mesogen 2 and spacer 2.

LCE B had a Tg of −15° C. and Ti of about 42° C. The LCE C chemistry used 50% mesogen 1, 50% mesogen 2, and spacer 2. The LCE C had a Tg of about −2° C. and Ti of about 58° C. The LCE D chemistry used 30% mesogen 1, 70% mesogen 2, and spacer 2. The LCE D had a Tg of about −10° C. and Ti of about 55° C. The LCE D is ideal for this application where good impact absorption and dissipation of energy (high tan delta) is required between −10° C. and 54° C.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A pad for a helmet, the pad comprising:

a first lattice structure comprising a buckling column, an LCE column, and a plurality of struts extending between the buckling and LCE columns; and an LCE pillar disposed within the LCE column, wherein the LCE pillar comprises an LCE chemistry having a first mesogen and a second mesogen, and wherein the LCE pillar is press fit into the LCE column.

2. The pad of claim 1, wherein the pad comprises a first region and a second region, the first region comprising the first lattice structure and the second region comprising a second lattice structure.

3. The pad of claim 2, wherein the second lattice structure comprises a different lattice pattern from the first lattice structure.

4. The pad of claim 2, wherein the first region is a layer that extends completely over the second region.

5. The pad of claim 2, wherein the first region extends only partially over the second region.

6. The pad of claim 1, wherein the diameter of the buckling column is greater than the diameter of the LCE column.

7. The pad of claim 1, wherein the diameter of the buckling column is smaller than the diameter of the LCE column.

8. The pad of claim 2, wherein the first lattice structure is a structured Voronoi lattice.

9. The pad of claim 1, wherein the LCE pillar is comprised of monodomain LCE.

10. The pad of claim 9, wherein the LCE pillar is oriented in the direction of impacts.

11. The pad of claim 1, wherein the LCE pillar has a glass transition temperature of about 5° C. and a nematic to isotropic temperature of about 65° C.

12. The pad of claim 1, wherein the LCE pillar has a glass transition temperature of about −10° C. and a nematic to isotropic temperature of about 55° C.

* * * * *